United States Patent
Boggie et al.

(10) Patent No.: US 10,621,626 B2
(45) Date of Patent: Apr. 14, 2020

(54) SYSTEM FOR AND METHOD OF GENERATING ADVERTISING INVENTORY BY MARKETERS SHARING CONTENT WITH OTHERS

(71) Applicant: The New York Times Company, New York, NY (US)

(72) Inventors: Matthew T. Boggie, Brooklyn, NY (US); Amy E. Hyde, Brooklyn, NY (US); Guy Dassa, New Rochelle, NY (US); Bobby Roe, Brooklyn, NY (US)

(73) Assignee: The New York Times Company, New York, NY (US)

( * ) Notice: Subject to any disclaimer, the term of this patent is extended or adjusted under 35 U.S.C. 154(b) by 876 days.

(21) Appl. No.: 14/959,165

(22) Filed: Dec. 4, 2015

(65) Prior Publication Data

US 2016/0086234 A1    Mar. 24, 2016

Related U.S. Application Data

(63) Continuation of application No. 13/210,833, filed on Aug. 16, 2011, now Pat. No. 9,208,517.

(51) Int. Cl.
| | | |
|---|---|---|
| *G06Q 30/00* | (2012.01) | |
| *G06Q 30/02* | (2012.01) | |
| *G06Q 50/00* | (2012.01) | |
| *H04L 12/58* | (2006.01) | |
| *H04L 29/08* | (2006.01) | |

(52) U.S. Cl.
CPC ......... *G06Q 30/0277* (2013.01); *G06Q 50/01* (2013.01); *H04L 51/32* (2013.01); *H04L 67/02* (2013.01)

(58) Field of Classification Search
CPC .................................. G06Q 30/0207–30/0277
USPC ............................................. 705/14.1–14.73
See application file for complete search history.

(56) References Cited

U.S. PATENT DOCUMENTS

| | | | |
|---|---|---|---|
| 6,985,934 B1 | 1/2006 | Armstrong et al. | 709/219 |
| 7,080,139 B1 | 7/2006 | Briggs et al. | 709/224 |
| 7,925,708 B2 | 4/2011 | Davis et al. | 709/206 |
| 8,094,794 B2 | 1/2012 | Wright | 379/114.13 |
| 8,135,801 B2 | 3/2012 | Harper et al. | 709/217 |
| 8,224,897 B2 | 7/2012 | Kanazawa et al. | 709/204 |

(Continued)

*Primary Examiner* — Luis A Brown
*Assistant Examiner* — Allan J Woodworth, II
(74) *Attorney, Agent, or Firm* — Rothwell, Figg, Ernst & Manbeck, P.C.

(57) ABSTRACT

A system of generating advertising inventory by marketers sharing content with others via a social network or other electronic communication across a network. This embodiment may include allowing one or more content providers to provide links to content items. The content items may be provided directly by the content provider or by a clearinghouse entity or other intermediary. A subscriber may then search for relevant content items from one or more content providers. The subscriber may provide ancillary content for association with the selected content item. Thus, when the subscriber shares a URL identifying the selected content item via a social network, the URL may be encoded with a unique identifier identifying the subscriber. When the URL is clicked by a user, an ad server on the publisher's side may recognize the unique identifier and display the content item with the ancillary content provided by the subscriber.

9 Claims, 9 Drawing Sheets

(56) References Cited

U.S. PATENT DOCUMENTS

| | | | |
|---|---|---|---|
| 8,346,229 B2 | 1/2013 | Scott | 455/414.2 |
| 2003/0081000 A1* | 5/2003 | Watanabe | G06F 16/957 |
| | | | 715/751 |
| 2004/0267610 A1 | 12/2004 | Gossett et al. | 705/14 |
| 2005/0261965 A1* | 11/2005 | Eisen | G06Q 10/107 |
| | | | 705/14.4 |
| 2011/0161398 A1* | 6/2011 | Guccione | G06Q 10/10 |
| | | | 709/203 |

* cited by examiner

SYSTEM FOR AND METHOD OF GENERATING ADVERTISING INVENTORY BY MARKETERS SHARING CONTENT WITH OTHERS

CROSS-REFERENCE TO RELATED APPLICATION(S)

This application is a continuation of U.S. application Ser. No. 13/210,833, filed on Aug. 16, 2011 (status pending), which is incorporated by reference.

TECHNICAL FIELD

The present invention relates to content sharing events, generally, and a system for and method of generating advertising inventory by marketers sharing content with their followers, friends and visitors, in particular.

BACKGROUND

Social networking tools have become popular among Internet users in recent years. Many content providers and marketers may consider social networks to be significant distribution resources for sharing electronic content among Internet users. Accordingly, these content providers and marketers may desire to learn new and better ways to leverage the distribution of electronic content through social networking tools (or through social networks).

Marketers struggle for more ways to connect with consumers through social networks. Unfortunately, most brands simply talk about themselves in the social sphere. Consumers may learn about a sale or the launch of new products by following a brand on a social networking site but consumers generally do not learn much about what that brand stands for.

BRIEF DESCRIPTION OF THE DRAWINGS

Purposes and scope of exemplary embodiments described below will be apparent from the following detailed description in conjunction with the appended drawings in which like reference characters are used to indicate like elements, and in which.

SUMMARY

Figure 1:
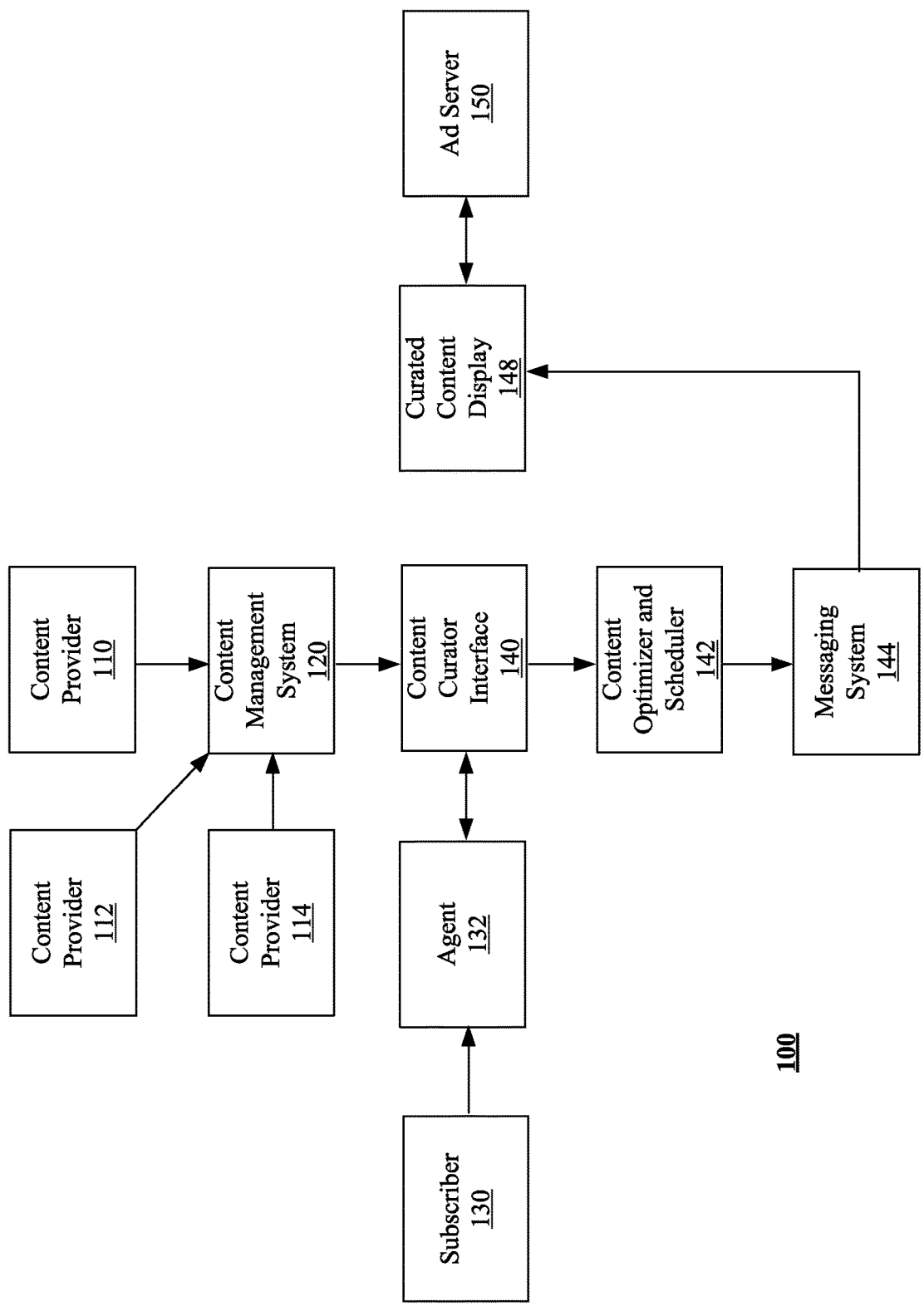
FIG. 1 illustrates a block diagram of system for generating advertising inventory according to an embodiment of the invention.

At least one exemplary embodiment may provide a method of generating advertising inventory by marketers sharing content with others via a social network or other electronic communication across a network. This embodiment may include allowing one or more content providers, such as a publisher, to provide links to content items, such as articles, news stories, videos, etc. The content items may be provided directly by the content provider or by a clearinghouse entity or other intermediary. A subscriber, such as an advertiser or marketer, may then search for relevant content items from one or more content providers. The subscriber may provide ancillary content, such as an advertisement or other electronic content, for association with the selected content item. Thus, when the subscriber shares a URL identifying the selected content item, such as an article, via a social network, the URL may be encoded with a unique identifier identifying the subscriber. When the URL is clicked by a user, an ad server on the publisher's side may recognize the unique identifier and display the content item with the ancillary content provided by the subscriber. The ad server may be associated with the publisher, clearinghouse entity and/or other entity.

DETAILED DESCRIPTION OF EMBODIMENTS OF THE INVENTION

A user of a social networking tool may share a uniform resource locator (URL) of a content item (e.g., electronic content, digitally published newspaper articles, digitally published magazine articles, electronic books, video or interactive graphics, etc.) digitally published on a website (e.g., www.nytimes.com, www.about.com) with other users of a social network through a series of one or more content sharing events (e.g., one or more broadcasts, one or more tweets, one or more emails). In such instances, the user may broadcast the URL of the content item to multiple users (e.g., users of the social network) who then access the content item (e.g., the webpage displaying the content item) by activating (e.g., clicking on, accessing, downloading) the shared URL of the content item.

Content providers (e.g., the publishers of any electronic content) may desire to provide marketing opportunities for advertisers when content is broadcast, distributed or otherwise initiated by the advertiser. For example, the publishers of www.nytimes.com may desire to display advertisement associated with an advertiser when that advertiser shares (e.g., broadcasted and rebroadcasted to, tweeted and retweeted to) a New York Times news article to a large group of Twitter users (e.g., users of www.twitter.com). The advertiser may search for relevant and interesting content that reinforces the advertiser's message or brand and share that content with those who are interested (e.g., followers, fans, friends, etc.). The URL that is shared has a marketer's unique ID and/or campaign tag in it so that when their followers click on the shared article, the brand's marketing may be served with the publisher's original content. As a result of this marketing opportunity, advertisers will be incentivized to share content from publishers who provide this service.

FIG. 1 illustrates a block diagram of a content sharing system according to an embodiment of the present invention.

In one embodiment, a content provider 110 may communicate with a content management system 120 which may be communicatively coupled to a content curator interface 140, scheduler 142, messaging system 144, curated content display 148 and ad server 150 using any, or a combination, of data networks and various data paths. Accordingly, data signals may be transmitted to any of the components of the system 100 and transmitted from any of the components of the system 100 using any, or a combination, of data networks and various data paths. For example, encode data signals, broadcast data signals, browse data signals, or any other data signals may be transmitted to any of the components of the system 100 and transmitted from any of the components of the system 100 using any, or a combination, of data networks and data paths.

The data networks may be a wireless network, a wired network, or any combination of wireless network and wired network. For example, the data network may include any, or a combination, of a fiber optics network, a passive optical network, a radio near field communication network (e.g., a Bluetooth network), a cable network, an Internet network, a satellite network (e.g., operating in Band C, Band Ku, or Band Ka), a wireless local area network (LAN), a Global System for Mobile Communication (GSM), a Personal Communication Service (PCS), a Personal Area Network (PAN), D-AMPS, Wi-Fi, Fixed Wireless Data, IEEE 802.11a, 802.11b, 802.15.1, 802.11n and 802.11g or any other wired or wireless network configured to transmit or receive a data signal. In addition, the data network may include, without limitation, a telephone line, fiber optics, IEEE Ethernet 802.3, a wide area network (WAN), a LAN, or a global network, such as the Internet. Also, the data network may support, an Internet network, a wireless communication network, a cellular network, a broadcast network, or the like, or any combination thereof. The data network may further include one, or any number of the exemplary types of networks mentioned above operating as a stand-alone network or in cooperation with each other. The data network may utilize one or more protocols of one or more network elements to which it is communicatively coupled. The data network may translate to or from other protocols to one or more protocols of network devices. It should be appreciated that according to one or more embodiments, the data network may comprise a plurality of interconnected networks, such as, for example, a service provider network, the Internet, a broadcaster's network, a cable television network, corporate networks, and home networks.

Each illustrative block may transmit data to and receive data from data networks. The data may be transmitted and received utilizing a standard telecommunications protocol or a standard networking protocol. For example, one embodiment may utilize Session Initiation Protocol (SIP). In other embodiments, the data may be transmitted, received, or a combination of both, utilizing other VoIP or messaging protocols. For example, data may also be transmitted, received, or a combination of both, using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and systems suitable for transmitting and receiving data. Data may be transmitted and received wirelessly or may utilize cabled network or telecom connections such as: an Ethernet RJ45/Category 5 Ethernet connection, a fiber connection, a traditional phone wire-line connection, a cable connection, or other wired network connection. The data network 104 may use standard wireless protocols including IEEE 802.11a, 802.11b, 802.11g, and 802.11n. The data network may also use protocols for a wired connection, such as an IEEE Ethernet 802.3.

The content management system 120 may include, but is not limited to, a computer device or communications device. For example, the content management system 120 may include a personal computer (PC), a workstation, a mobile device, a thin system, a fat system, a network appliance, an Internet browser, a server, a lap top device, a VoIP device, an ATA, a video server, a Public Switched Telephone Network (PSTN) gateway, a Mobile Switching Center (MSC) gateway, or any other device that is configured to receive and store content items (e.g., electronic content, digitally published newspaper articles, digitally published magazine articles, electronic books) and generate browsing data associated with one or more users that access content items via the content management system 120. Content management system 120 may be associated with one or more content providers or operated by an independent entity, such as a clearinghouse.

The content curator interface 140 may include, but is not limited to, a computer device or communications device. For example, the content curator interface 140 may include a personal computer (PC), a workstation, a mobile device, a thin system, a fat system, a network appliance, an Internet browser, a server, a lap top device, a VoIP device, an ATA, a video server, a Public Switched Telephone Network (PSTN) gateway, a Mobile Switching Center (MSC) gateway, or any other device that is configured to index (e.g., encode, shorten) a URL associated with a content item digitally published via the content curator interface 140, store or generate encode data associated with one or more URLs. The content curator interface 140 may provide a URL encoding service, such as the URL shortening service provided by www.bit.ly, www.tinyurl.com, or any other URL indexing service. Content curator interface 140 may be coupled to or integrated with scheduler 142. The content curator device may interface with third party services that provide data about how certain topics are trending in real time on various social network or publisher sites. The content curator may interface with other third party systems that provide data that helps to curate the content in any way.

The messaging system 144 may include, but is not limited to, a computer device or communications device. For example, the messaging system 144 may include a personal computer (PC), a workstation, a mobile device, a thin system, a fat system, a network appliance, an Internet browser, a server, a lap top device, a VoIP device, an ATA, a video server, a Public Switched Telephone Network (PSTN) gateway, a Mobile Switching Center (MSC) gateway, or any other device that is configured to activate content sharing events (e.g., broadcasts, tweets, emails) and store or generate broadcast data associated with one or more content sharing events.

Ad server 150 may include, but is not limited to, a computer device or communications device. For example, the ad server 150 may include a personal computer (PC), a workstation, a mobile device, a thin system, a fat system, a network appliance, an Internet browser, a server, a lap top device, a VoIP device, an ATA, a video server, a Public Switched Telephone Network (PSTN) gateway, a Mobile Switching Center (MSC) gateway, or any other device that is configured to display and/or generate content with ancillary content based on the appended unique identifier and/or campaign identifier. Ad server 150 may be associated with or separate from content provider 110, 112, 114 and/or content management system 120. Ad server 150 may provide various types of content, including but not limited to advertisement, video, audio, images, animation, code, etc.

The data paths disclosed herein may include any device that communicatively couples devices to each other. For example, a data path may include one or more networks or one or more conductive wires (e.g., copper wires).

In one embodiment, one or more content providers, as illustrated by 110, 112, 114, may provide content to a content management system 120. The content management system 120 may include computer-implemented software, hardware, or a combination of both, configured to store and provide search capabilities for content items from one or more content providers 110, 112, 114. A content provider, such as a publisher, news source, online magazine, may set up lists of the articles, pages, or other content items they wish to make available. A content item may include any, or a combination, of electronic content, digitally published newspaper articles, digitally published magazine articles, and electronic books. Other examples of content items may include video, audio, images and/or other electronic information. Accordingly, aggregated content from multiple content providers may be available to subscribers, advertisers, marketers and other interested entities. The aggregated content may be accessible via a network connection. Content may be provided by a single source or multiple sources. For multiple sources, content management system 120 may be operated by a clearinghouse entity that receives and stores content from a plurality of content providers and provides searching capabilities for the aggregated content for a plurality of subscribers, advertisers and/or marketers.

A subscriber, as shown by 130, may include an advertiser, marketer, and/or other provider of ancillary content. Subscriber 130 may set up a campaign with one or more content providers directly or through an agent or other intermediary, as shown by 132. Subscriber 130 may provide ancillary content, such as an advertisement creative, via the content curator interface 140. While a single content curator interface 140 is illustrated, multiple interfaces may be provided for various users. Other examples of ancillary content may include audio, video, illustration, text, narrative, animation, etc. Subscriber 130 may be assigned a unique identifier that identifies the subscriber. Advertisers may also establish different campaigns with participating publishers. For example, a department store may have multiple campaigns for different target audiences. For women-specific articles, the department store may provide select ancillary content (e.g., advertisements) related to women's clothing, shoes, fashion, etc. For family related stories, the department store may provide content related to children's clothing, toys, furniture, etc. Also, a subscriber may associate one group of ancillary content with a news source publisher while another group of ancillary content may be associated with a different content provider, such as an online magazine.

A content curator interface 140 may allow the subscriber to search for content using keywords that relate to their brand. Other search criteria may include date range, title search or a variety of other search methods. The subscriber may search through a single content provider's content, multiple content providers' content and/or other subset of content. Also, content management system 120 may provide pre-searched or pre-selected content to the subscriber where articles and/or other content may be recommended to the subscriber based on keywords, category, historical article selection and/or other factors. For example, a shoe brand may subscribe to an embodiment of the present invention. In doing so, the system may then provide content from various news sources that may be relevant to the particular brand of shoes. For example, an article that mentions a celebrity wearing the shoe brand may be recommended. Other articles of relevance may include trends in shoes, stories involving the shoe brand's celebrity spokesperson, etc. Accordingly, relevant content may be provided to or selected by the subscriber.

Once relevant content is selected, provided or otherwise associated with the subscriber, an embodiment of the present invention may append the content identifier (e.g., URL) with the assigned unique identifier associated with the subscriber. The unique identifier may be a hash tag or other identifier, code or tag within the URL. The unique identifier thus indicates who is sharing the content. Also, a specific campaign identifier may also be appended to the content identifier. The campaign identifier may be used to identify which specific ancillary content or queue of ancillary content for inclusion with the content. Thus, the URL for the article may be appended with the marketer's unique ID and campaign identifier. This may be done using a URL shortening service or it can remain in long form.

Content curator interface 140 may include computer-implemented software, hardware, or a combination of both, configured to index (e.g., encode, shorten) a full version of a URL of a content item. In one embodiment, indexing a full version of a URL of a content item may include creating a shortened version of the URL by hashing the URL using a hash function. Content curator interface 140 may encode each URL with a unique identifier associated with the subscriber and a campaign identifier. Content curator interface 140 may be associated with a content provider, clearinghouse entity and/or other entity.

Additional identifiers may also be used to further customize ancillary content. For example, a demographic identifier may be appended to the content identifier. According to another example, an embodiment of the present invention may recognize certain types of users from certain social networks. In doing so, demographic and/or other personal data may be accessible and used to further customize the ancillary content. For example, if a user links to an article posted by an advertiser and the user comes from a specific social network, an embodiment of the present invention may use demographic and/or other personal data to further target the advertisement. Also, an embodiment of the present invention may recognize users with subscriptions to a publisher or affiliate where demographic and/or other data may be accessible and utilized. Therefore, marketers could traffic multiple creatives to target different demographics.

The content curator interface 140 may publish the content to the subscriber's chosen location. In addition, a content optimizer and scheduler 142 may apply publishing business rules to the content and it may publish at a later time. Content optimizer and scheduler 142 may display (e.g., digitally publish) content at a predetermined time or schedule. For example, certain information may be more relevant at certain times of the day or during weekdays instead of weekends. Also, an embodiment of the present invention may allow the subscriber or marketer to create a queue of articles that they want to share along with a schedule so that the articles may be automatically posted at predetermined times. For example, a marketer may promote an upcoming event sponsored by the marketer for a predetermined period of time.

Messaging system 144 may display (e.g., digitally publish) one or more content items to one or more users. Messaging system 144 may include computer-implemented software, hardware, or a combination of both, configured to provide communication between content curator interface 140 and ad server 150. In one embodiment, a content sharing event may include any event in which a content item identified by a URL or other identifier is shared with one or more users. For example, the messaging system 144 may activate a content sharing event (e.g., a broadcast) that shares an encoded URL with other users. Messaging system 144 may also communicate a content item via electronic communication, such as electronic mail, text, etc.

The URL may be shared anywhere the subscriber chooses to share it via a messaging system 144, such as Twitter, Facebook, blogs, email, or other form of electronic communication, electronic publication or broadcast. When a user selects that URL, ad server 150 may use one or more identifiers that have been attached to recognize the subscriber and/or the campaign and serve that subscriber's ancillary content, such as an ad creative, with the content. Ad server 160 may be associated with or separate from one or more content providers or clearinghouse entity. In addition, customized or preselected rules for the prioritization of that ad creative may be applied. According to an exemplary embodiment, placement may be determined by the publisher's ad server 150. For example, subscribers may pay for more prominent placing of the ancillary content as well as for more complex content, such as animation, video, overlay, etc.

When the URL is activated by a user, ad server 150 may recognize the unique identifier and/or campaign identifier encoded with the URL and display the content with the associated ancillary content via curated content display 148. Curated content display 148 may be associated with any computer or mobile device with a display.

According to another example, a subscriber may "like" an article published on a content provider's page. Thus, when the subscriber "likes" an article, users of a social network may click on the article and view the article with the subscriber's ancillary content. Also, when a user views an article published by a content provider, the user may navigate away from that specific article and view other stories from that content provider. An embodiment of the present invention may provide the same, related or other ancillary content from the subscriber on other pages as well.

User profile information may be also used to further customize ancillary content. For example, user profile information may include a collection of data that indicates one or more characteristics of a particular user. For example, a user profile may include any, or a combination, of a location portion, a demographic portion, and any other portions that may be used to describe a characteristic of a particular user.

For example, a clothing company may post an article relating to summer trends from a popular magazine. The company may post the article on a social network or otherwise make the article available via an electronic communication. When a user clicks on the article, ad server 150 may recognize the unique identifier associated with the clothing company and display the article with advertisement relating to the clothing company's summer sale. If the user has an account with the publisher or even the social network, demographic information about the user may indicate that the user has young children. In this case, when the user clicks on the article, the article may be displayed with additional content related to the clothing company's childrens line. According to another example, a travel company may post articles relating to summer travel experiences from a news publisher (e.g., www.nytimes.com) and associate family friendly vacation packages for this user. Thus, when the user clicks on the summer travel article, the ad server may recognize the travel company's identifier and display ancillary content advertising family vacation deals. According to yet another example, an automobile manufacturer may post an article regarding family friendly road trips destinations from a travel publication and associate advertisements for minivans and other family friendly vehicles for this user.

Thus, an embodiment of the present invention incentivizes a subscriber, such as an marketer, to create their own inventory by sharing the unique URL. For each campaign, the marketer may pay a set up fee, pay a fixed CPM, etc. Also, the campaign may be capped at a certain number of impressions. According to another example, a clearinghouse entity may be used where a subscriber, such as an advertiser or marketer, pays for a subscription for the content service. Also, the advertiser may pay a premium for the number of clicks. In a similar manner, a content provider, such as a publisher, may pay for a subscription and/or the number of clicks. Other business models may apply.

Another feature may include an auto-login to a social media or other sites to automate the publishing of the links. The content curator interface 140 may retain authorization information (e.g., username and password combinations, authentication tokens, or other such mechanisms) whereby sharing messages may distributed on behalf of the subscriber. For example, a subscriber may store their login authorization for Twitter, such that tweets containing the relevant content identifiers are sent at predetermined times on their behalf, without the need for them to log in manually to distribute each message.

Figure 2:
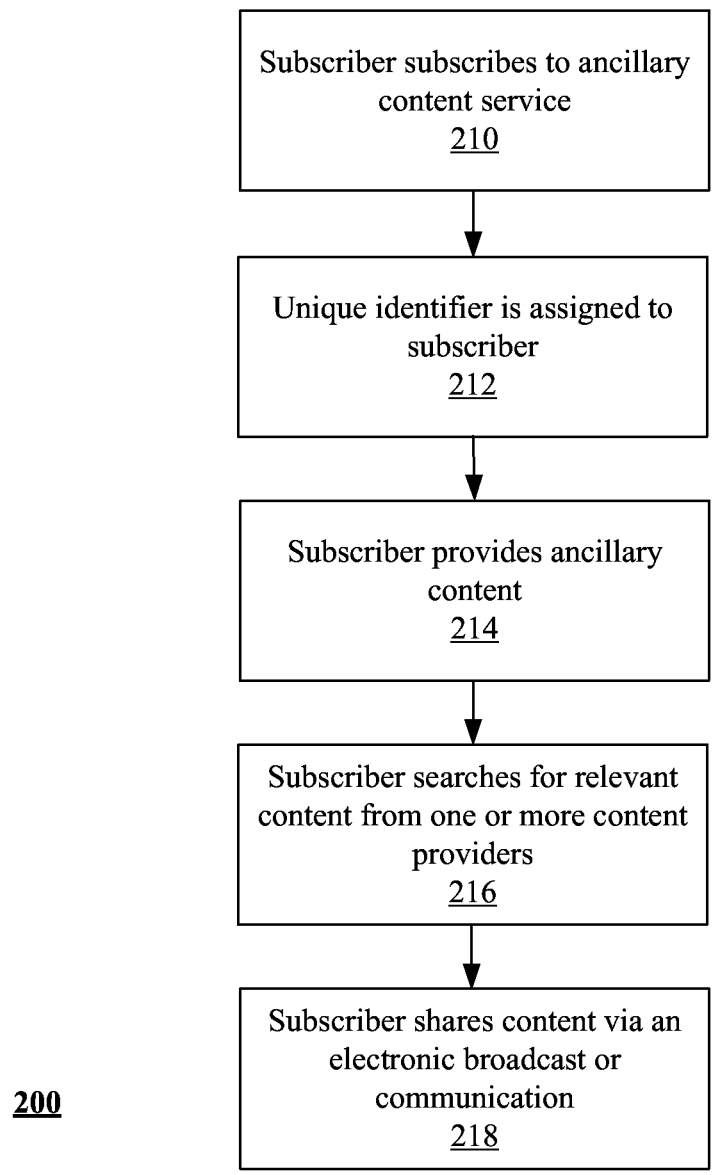
FIG. 2 is a flow chart illustrating a method of associating ancillary content with content from one or more content providers according to an embodiment of the invention.

FIG. 2 is a flow chart illustrating a method of associating ancillary content with content from one or more content providers according to an embodiment of the invention. This method is provided as an example; there are a variety of ways to carry out methods disclosed herein. The method 200 shown in FIG. 2 can be executed or otherwise performed by one or a combination of various systems. The method 200 is described below as carried out by the system 100 shown in FIG. 1 by way of example, and various elements of the system 100 are referenced in explaining the example method of FIG. 2. Each block shown in FIG. 1 represents one or more processes, methods, or subroutines carried in the method 200. Referring to FIG. 2, the method 200 may begin at block 210.

At step 210, a subscriber, such as a marketer or advertiser, may subscribe to a service provided by an embodiment of the present invention. A subscriber may also include individuals, celebrities, non-profit organizations, universities and/or any entity wanting to provide ancillary content with a content item.

At step 212, a unique identifier may be assigned to the subscriber. The unique identifier may be used to identify the subscriber so that when the content is accessed, the ad server may recognize the subscriber and accordingly display the associated ancillary content. Additional identifiers, including a campaign identifier, may also be used.

At step 214, the subscriber may provide ancillary content. Ancillary content may include advertisement, images, videos, etc. For example, a movie production company may want to promote an upcoming film or new television show.

Ancillary content may include a preview or images from the upcoming film or show. A non-profit organization may want to associate environmental protection campaigns with relevant content from various publishers.

At step 216, the subscriber may search, select, receive or otherwise identify relevant content provided by one or more content providers. The marketer may use search terms and other search criteria to find useful and relevant content. Also, the marketer may be provided with preselected content.

At step 218, the subscriber may share the relevant content with one or more users so that when a user clicks on the URL, ancillary content associated with the subscriber may be displayed.

Figure 3:
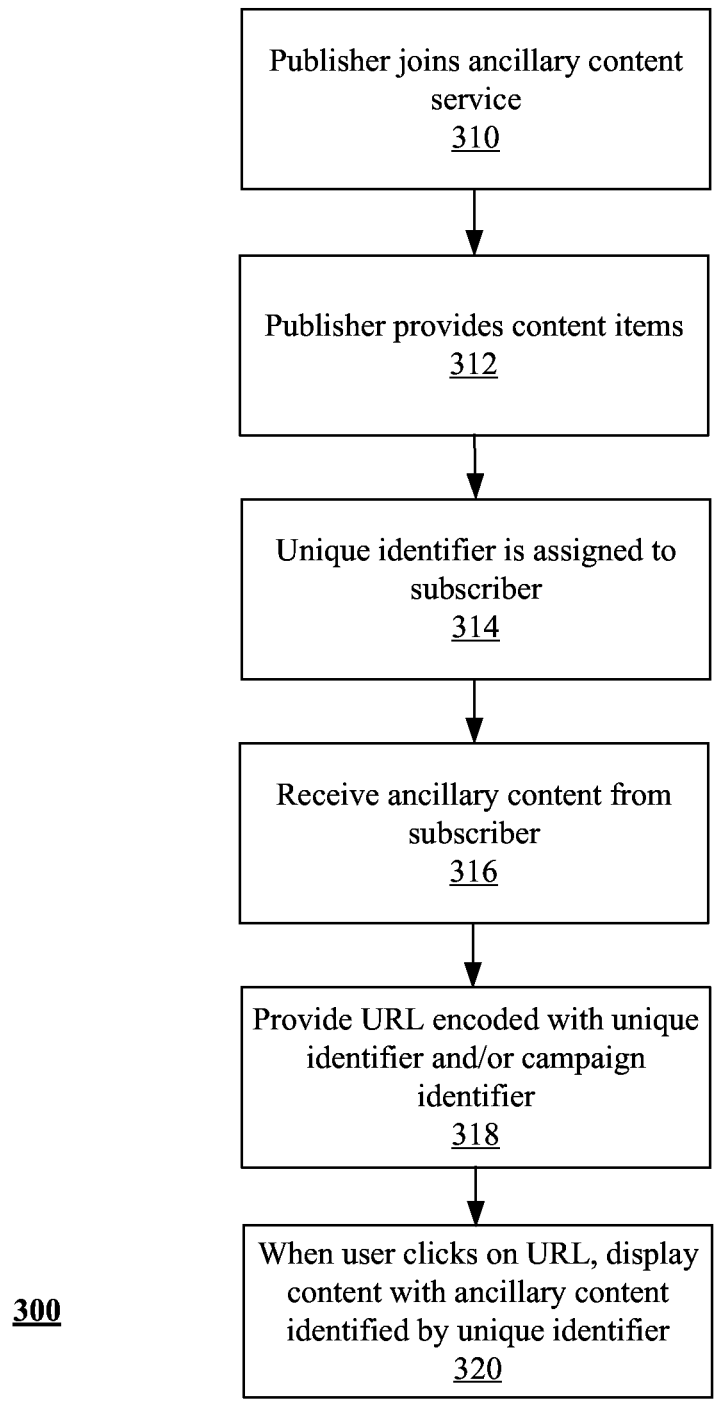
FIG. 3 is a flow chart illustrating a method of making content available for association with ancillary content according to an embodiment of the invention.

FIG. 3 is a flow chart illustrating a method of making content available for association with ancillary content according to an embodiment of the invention. This method is provided as an example; there are a variety of ways to carry out methods disclosed herein. The method 300 shown in FIG. 3 can be executed or otherwise performed by one or a combination of various systems. The method 300 is described below as carried out by the system 100 shown in FIG. 1 by way of example, and various elements of the system 100 are referenced in explaining the example method of FIG. 3. Each block shown in FIG. 1 represents one or more processes, methods, or subroutines carried in the method 300. Referring to FIG. 3, the method 300 may begin at block 310.

At step 310, a content provider, such as a publisher, may join an embodiment of the present invention. Publishers may include news sources, such as an online magazine or newspaper, or any provider of content.

At step 312, the content provider may provide content to be associated with ancillary content. For example, a content provider, such as a news source, may provide various links to articles, videos and other content for association with ancillary content. An advertiser may search and identify content that the advertiser would like to share to its customers, fans and/or followers through a social network or via an electronic communication.

At step 314, a unique identifier may be assigned to a subscriber. In addition, a campaign identify may be assigned as well. The content provider or intermediary may assign a unique identifier to the subscriber. A campaign identifier may also be used to identify different groups of ancillary content associated with a particular advertiser. For example, an advertiser may designate a first group of advertisements for distribution with certain articles (e.g., campaign 1) and a second group of ancillary content, e.g., videos, audios, etc., for distribution in email communications (e.g., campaign 2). Additional identifiers may be used to further tailor or customize the ancillary content.

At step 316, the content provider may receive ancillary content from the marketer.

At step 318, the content provider may provide a URL to the content provider's content appended with the unique identifier. In addition, other appended identifiers, such as a campaign identifier, may be used. The URL may be encoded or otherwise shortened by a shortening service. The marketer may then distribute, post, forward or otherwise make available the content identified by the encoded URL to one or more users. At step 320, in response to a user click or other activation, the content associated with the URL may be displayed with the ancillary content associated with the unique identifier.

Figure 4:
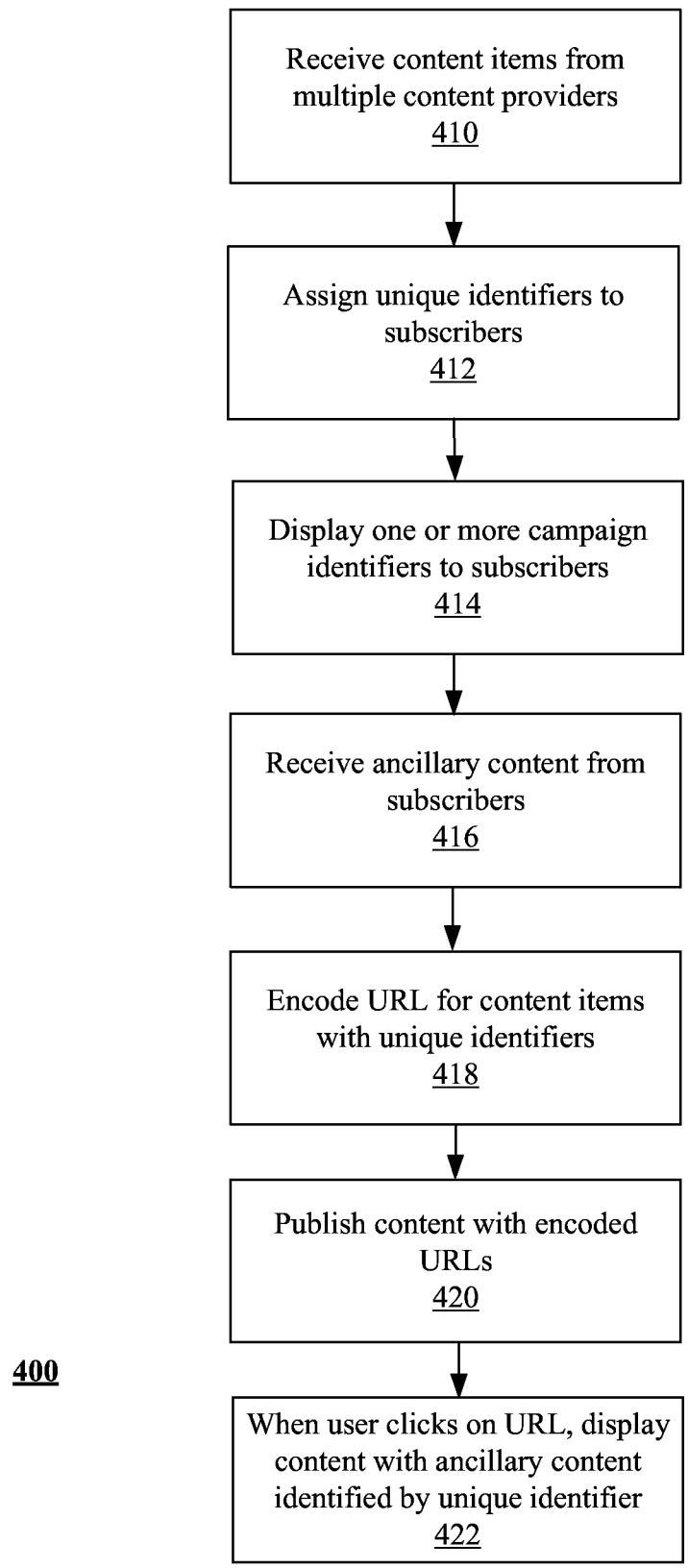
FIG. 4 is a flow chart illustrating a method of providing ancillary content according to an embodiment of the invention.

FIG. 4 is a flow chart illustrating a method of providing ancillary content according to an embodiment of the invention. This method is provided as an example; there are a variety of ways to carry out methods disclosed herein. The method 400 shown in FIG. 4 can be executed or otherwise performed by one or a combination of various systems. The method 400 is described below as carried out by the system 100 shown in FIG. 1 by way of example, and various elements of the system 100 are referenced in explaining the example method of FIG. 4. Each block shown in FIG. 1 represents one or more processes, methods, or subroutines carried in the method 400. Referring to FIG. 4, the method 400 may begin at block 410.

At step 410, a clearinghouse entity may receive content from multiple content providers. The clearinghouse entity may act as an independent intermediary to receive, store, categorize and/or otherwise maintain the content received from one or more content providers. The clearinghouse entity may also make the content available for searching by subscribers. According to another example, the clearinghouse entity may preselect the content for the subscribers based on category, predetermine criteria and/or other determination.

At step 412, the clearinghouse entity may assign unique identifiers for each subscriber. In addition, the clearinghouse entity may provide one or more campaign identifiers for each subscriber. Campaign identifiers may be used to further target and tailor the ancillary content for display with the selected content. The unique identifiers may be encoded in the URL identifying the selected content.

At step 414, one or more campaign identifiers may be provided to each subscriber from which the subscriber can choose from. By selecting the appropriate campaign identifier, the subscriber may associate specific ancillary content with the content items.

At step 416, the clearinghouse may receive ancillary content from each subscriber. For example, the marketer may provide one or more ancillary content items for display based on a priority schedule and/or other criteria or simply by a rotation where the next ancillary content in the queue is displayed.

At step 418, the clearinghouse may encode the URL for the content with the unique identifiers associated with the subscriber. The unique identifier may include a campaign identifier as well as other ancillary identifiers.

At step 420, the content may be published, broadcasted or otherwise displayed.

At step 422, in response to a user click or other activation, the content associated with the URL may be displayed with the ancillary content associated with the unique identifier.

Figure 5:
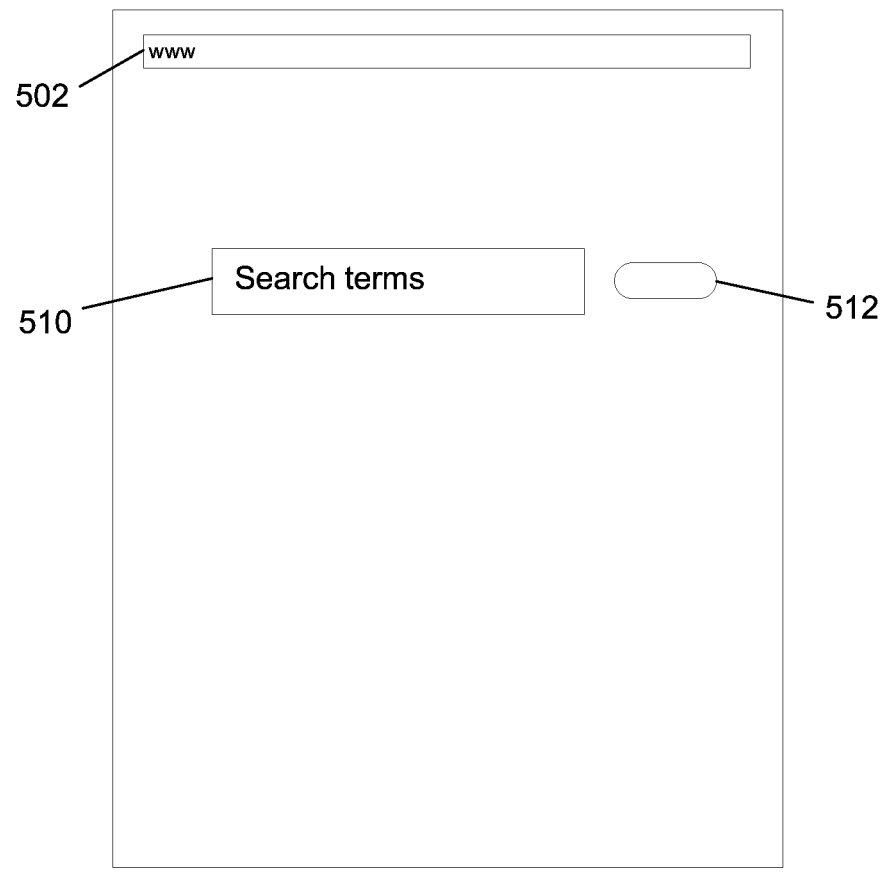
FIG. 5 is an exemplary screen shot illustrating a content search functionality according to an embodiment of the invention.

FIG. 5 is an exemplary screen shot illustrating a content search functionality according to an embodiment of the invention. This search functionality may be available through an online website by entering an appropriate address via 520. In box 510, search terms may be entered to search for content by selecting a search button 512. Other search functionality may include URL searching and other types of searching, such as title search, author search, subject matter, etc. Also, searching may be conducted via preselected categories and/or search terms. Results may also be narrowed by date range, relevancy, etc. Content search may be performed on a single content provider or multiple content providers. Subscribers may also select a subset of content providers.

Figure 6:
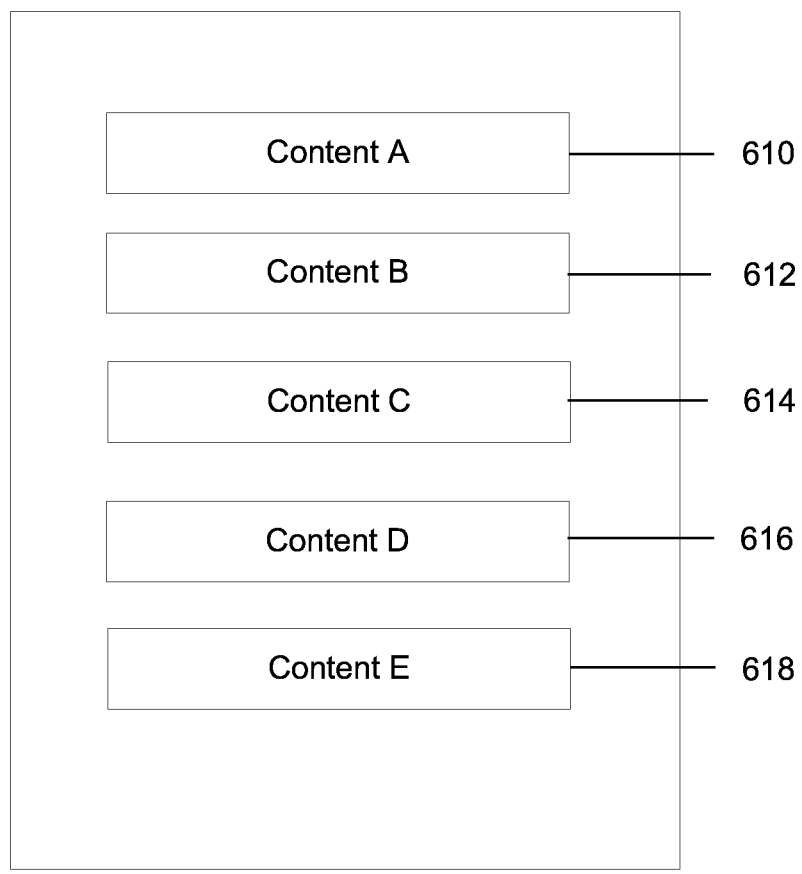
FIG. 6 is an exemplary screen shot illustrating results of a content search according to an embodiment of the invention.

FIG. 6 is an exemplary screen shot illustrating results of a content search according to an embodiment of the invention. Search results may be displayed as shown by 610, 612, 614, 616, and 618. The search results may be from one or more content providers. Also, an embodiment of the present invention may provide preselected content, without requiring input or search terms from the user.

Figure 7:
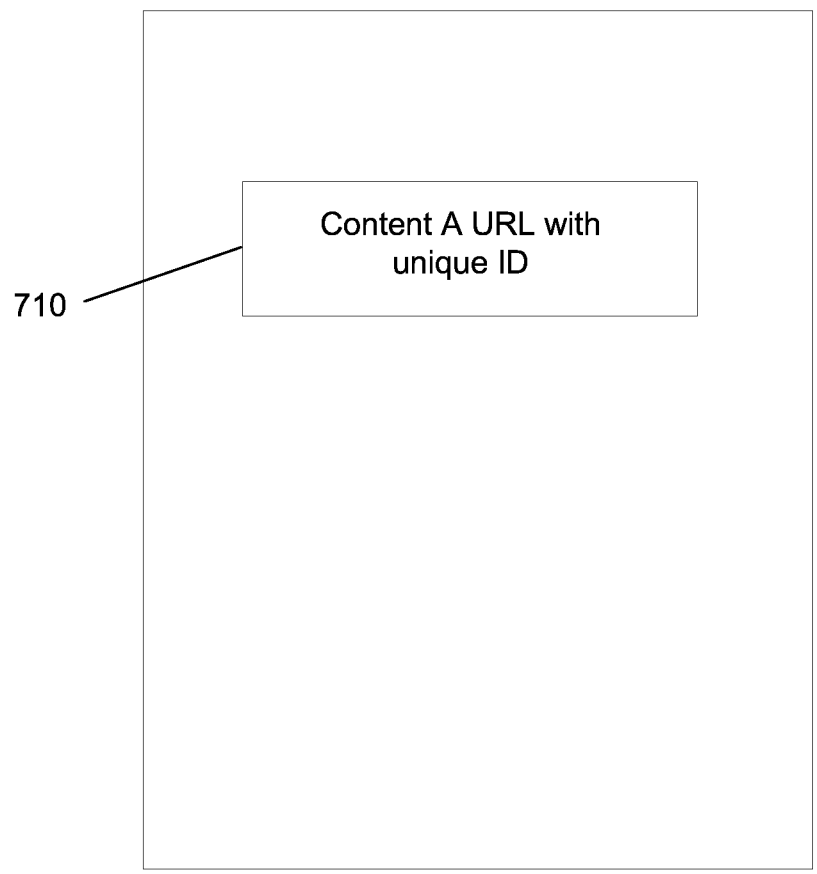
FIG. 7 is an exemplary screen shot illustrating a selected content with associated identifier according to an embodiment of the invention.

FIG. 7 is an exemplary screen shot illustrating a selected content with associated identifier according to an embodiment of the invention. After a subscriber selects a content, such as Content A 610 from FIG. 6, a URL with a unique identifier may be displayed for the subscriber, as shown by 710. The URL may also include a campaign identifier and/or other identifiers.

Figure 8:
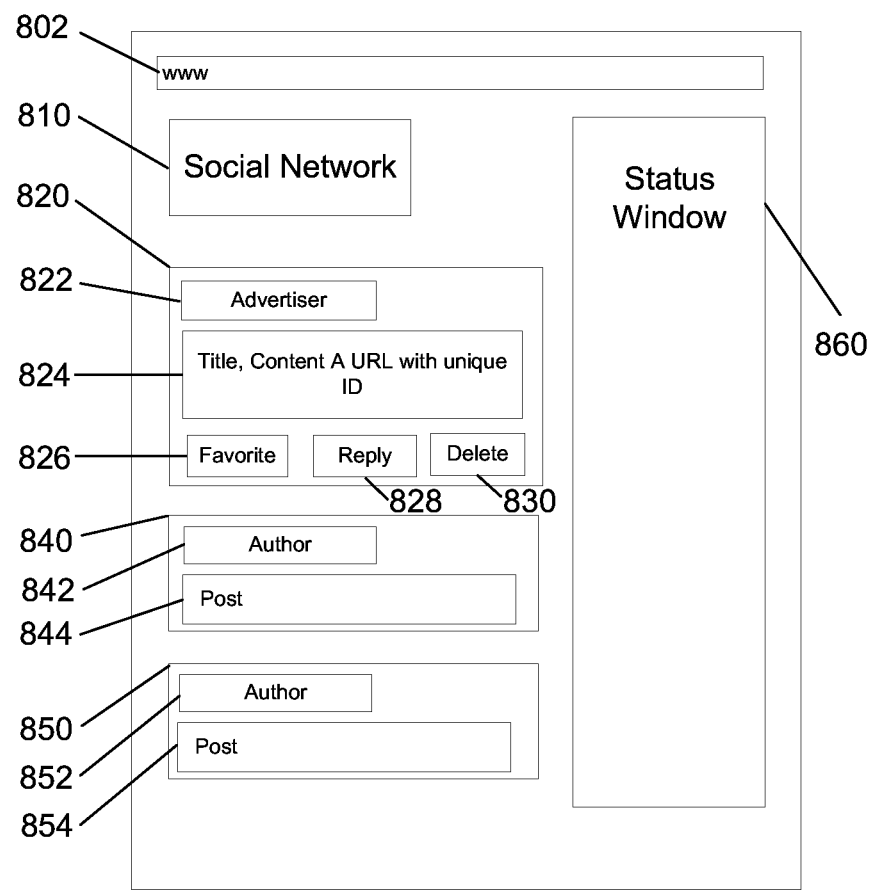
FIG. 8 is an exemplary screen shot illustrating a content sharing event according to an embodiment of the invention.

FIG. 8 is an exemplary screen shot illustrating a content sharing event according to an embodiment of the invention. The subscriber may share the URL through a social network, as shown by 810. The social network website may be accessed by entering an appropriate address, via 802. For example, the subscriber may share the content via window 820. In this example, the subscriber may be identified as an advertiser, as shown by 822. The subscriber may post or otherwise publish the content with the unique identifier, as shown by 824. The unique identifier may also include additional identifiers, such as a campaign identifier. Viewers may acknowledge the post by clicking on Favorite button 826. Other actions may include Reply 828 and Delete 830. Other posts may be viewed, as shown by window 840 where an author 842 and post content 844 may be displayed. Similarly, window 850 may also include author 852 and post content 854. A status window 860 may include other information from other users.

Figure 9:
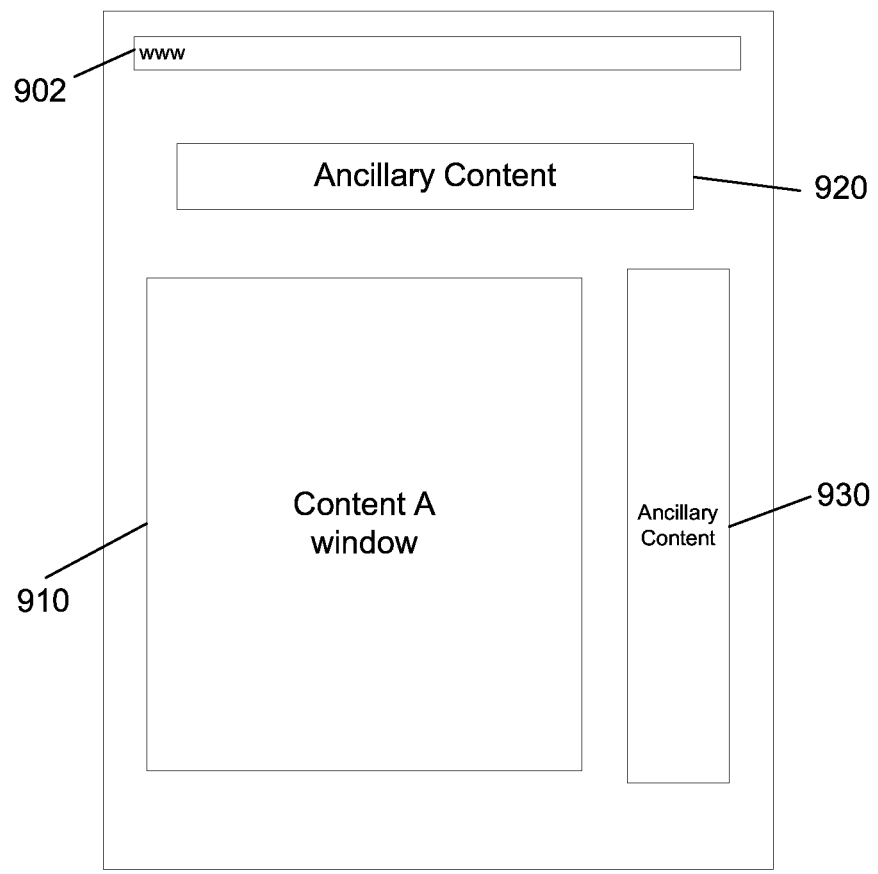
FIG. 9 is an exemplary screen shot illustrating shared content with associated ancillary content according to an embodiment of the invention.

FIG. 9 is an exemplary screen shot illustrating shared content with associated ancillary content according to an embodiment of the invention. When the URL is activated from the social network (e.g., by clicking URL displayed in 824 from FIG. 8), the viewer may view the content identified by the URL with the associated content from the subscriber. The URL (or some form of the URL) may be displayed in the address bar, 902. As shown in FIG. 9, 910 may display content A associated with the URL. Ancillary content, as shown by 920 and 930, may include content associated with the subscriber. The subscriber may be identified by the unique identifier associated with the URL and specific advertisements may be identified by a campaign identifier. For example, if the subscriber is a merchant, ancillary content 920 and 930 may include advertisements from that particular merchant.

The description above describes systems, networks, and reader devices, that may include one or more modules, some of which are explicitly shown in the figures. As used herein, the term "module" may be understood to refer to any, or a combination, of computer executable software, firmware, and hardware. It is noted that the modules are exemplary. The modules may be combined, integrated, separated, or duplicated to support various applications. Also, a function described herein as being performed at a particular module may be performed at one or more other modules or by one or more other devices instead of or in addition to the function performed at the particular module. Further, the modules may be implemented across multiple devices or other components local or remote to one another. Additionally, the modules may be moved from one device and added to another device, or may be included in multiple devices.

It is further noted that the software described herein is tangibly embodied in one or more physical media, such as, but not limited to any, or a combination, of a compact disc (CD), a digital versatile disc (DVD), a floppy disk, a hard drive, read only memory (ROM), random access memory (RAM), and other physical media capable of storing software. Moreover, the figures illustrate various components (e.g., systems, networks, and reader devices) separately. The functions described as being performed at various components may be performed at other components, and the various components may be combined or separated. Other modifications also may be made.

In the instant specification, various exemplary embodiments have been described with reference to the accompanying drawings. It will, however, be evident that various modifications or changes may be made thereto, or additional embodiments may be implemented, without departing from the broader scope of the invention as set forth in the claims that follow. The specification and drawings are accordingly to be regarded in an illustrative rather than a restrictive sense.

The invention claimed is:

1. A method of displaying on a website operated by or for a content provider subscriber content created by or for a subscriber of the content provider along with a content item published by the content provider, the method comprising:
   allocating to the subscriber a subscriber content identifier for use in identifying the subscriber content created by or for the subscriber;
   publishing a first resource identifier (RI), wherein the first RI was published by the content provider, the first RI identifies the content item published by the content provider, the first RI does not include the subscriber content identifier, and, when transmitted to the website in a request message, the first RI causes the website to respond with the content item;
   receiving the subscriber content created by or for the subscriber;
   linking the received subscriber content with the subscriber content identifier allocated to the subscriber so that the subscriber content can be identified using the subscriber content identifier;
   receiving, from a communication device being operated by an end-user, a message comprising a second RI, wherein the second RI comprises i) the subscriber content identifier allocated to the subscriber and ii) the first RI that identifies the content item, and further wherein the end-user is not the subscriber; and
   as a result of receiving the message comprising the second RI, transmitting to the end-user's communication device a response to the message, wherein
   the response to the message is configured to cause the user's communication device to concurrently display the content item and at least a subset of the subscriber content.

2. The method of claim 1, wherein the first RI is a first Uniform Resource Identifier (URI) and the second RI is a second URI.

3. The method of claim 2, wherein the first URI does not include the subscriber identifier.

4. The method of claim 3, wherein the subscriber content identifier identifies the subset of the subscriber content.

5. The method of claim 4, wherein
   the subscriber content comprises a first subset of the subscriber content and a second subset of the subscriber content, wherein the first subset is different than the second subset;
   the subscriber content identifier comprises a first identifier and a second identifier,
   the first identifier is linked with all of the subscriber content, and
   the second identifier identifies only the first subset of the subscriber content.

6. The method of claim 5, wherein the first identifier is a unique subscriber identifier that is uniquely associated with the subscriber.

7. A system for displaying on a website operated by or for a content provider subscriber content associated with a subscriber along with a content item published by the content provider, the system comprising:

a memory; and processing circuitry coupled to the memory, wherein the system is adapted to:

allocate to the subscriber a subscriber content identifier for use in identifying the subscriber content created by or for the subscriber;

publish a first resource identifier (RI), wherein the first RI was published by the content provider, the first RI identifies the content item published by the content provider, the first RI does not include the subscriber content identifier, and, when transmitted to the website in a request message, the first RI causes the website to respond with the content item;

receive the subscriber content created by or for the subscriber;

link the received subscriber content with the subscriber content identifier allocated to the subscriber so that the subscriber content can be identified using the subscriber content identifier;

receive, from a communication device being operated by an end-user, a message comprising a second RI, wherein the second RI comprises i) the subscriber content identifier allocated to the subscriber and ii) the first RI that identifies the content item, and further wherein the end-user is not the subscriber; and as a result of receiving the message comprising the second RI, transmit to the end-user's communication device a response to the message, wherein the response to the message is configured to cause the user's communication device to concurrently display the content item and at least a subset of the subscriber content.

8. The system of claim 7, wherein the first RI is a first Uniform Resource Identifier (URI) and the second RI is a second URI.

9. The system of claim 8, wherein the first URI does not include the subscriber identifier.

* * * * *